(12) United States Patent
Shilo et al.

(10) Patent No.: US 12,160,313 B2
(45) Date of Patent: Dec. 3, 2024

(54) DEVICE AND METHOD FOR SUPPORTING HYBRID AUTOMATIC REPEAT REQUEST (HARQ)

(71) Applicant: Huawei Technologies Co., Ltd., Shenzhen (CN)

(72) Inventors: Shimon Shilo, Hod Hasharon (IL); Leonid Epstein, Munich (DE); Yaron Ben-Arie, Hod Hasharon (IL); Ezer Melzer, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 628 days.

(21) Appl. No.: 17/237,867

(22) Filed: Apr. 22, 2021

(65) Prior Publication Data
US 2021/0242964 A1 Aug. 5, 2021

Related U.S. Application Data

(63) Continuation of application No. PCT/EP2018/078895, filed on Oct. 22, 2018.

(51) Int. Cl.
*H04L 1/00* (2006.01)
*H04L 1/1812* (2023.01)

(52) U.S. Cl.
CPC .......... *H04L 1/0041* (2013.01); *H04L 1/0047* (2013.01); *H04L 1/0059* (2013.01); *H04L 1/1819* (2013.01)

(58) Field of Classification Search
CPC .............................. H04L 1/00; H03M 13/1111
(Continued)

(56) References Cited

U.S. PATENT DOCUMENTS

| 8,261,159 B1 * | 9/2012 | Sommer ............. G06F 11/1048 713/193 |
| 2010/0180173 A1 | 7/2010 | Batra et al. |

(Continued)

FOREIGN PATENT DOCUMENTS

| CN | 102136885 A | 7/2011 |
| CN | 104506286 A | 4/2015 |

(Continued)

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11-2016, total 3534 pages (Approved Dec. 7, 2016).

(Continued)

*Primary Examiner* — Kiet M Doan
(74) *Attorney, Agent, or Firm* — Leydig, Voit & Mayer, Ltd.

(57) ABSTRACT

A transmitting device for supporting Hybrid Automatic Repeat Request (HARQ) includes scrambling and encoding, in which the order of scrambling and encoding is changed compared to the conventional transmitter. Likewise, a receiving device for supporting HARQ includes descrambling and decoding, in which the order of descrambling and decoding is changed compared to the conventional receiver. In particular, the transmitting device is configured to encode at least one data unit using Forward Error Correction (FEC) coding, scramble the encoded data unit based on a scrambling seed, provide an indication of the scrambling seed that is separate from the scrambled and encoded data unit, and transmit the indication of the scrambling seed and then the scrambled and encoded data unit to the receiving device.

15 Claims, 9 Drawing Sheets

(58) Field of Classification Search
USPC .................................. 370/252; 375/260, 300
See application file for complete search history.

(56) References Cited

U.S. PATENT DOCUMENTS

| | | |
|---|---|---|
| 2012/0237036 A1 | 9/2012 | Dabak et al. |
| 2015/0016426 A1* | 1/2015 | Merlin .............. H04W 72/0466 370/335 |
| 2016/0050097 A1* | 2/2016 | Atungsiri ............ H04L 27/2634 375/295 |
| 2016/0081087 A1 | 3/2016 | Kwon |
| 2016/0374037 A1* | 12/2016 | Lee ..................... H04J 13/0003 |
| 2017/0126456 A1* | 5/2017 | Lee ....................... H04W 84/12 |
| 2018/0076992 A1* | 3/2018 | Nabetani ............... H04L 1/1845 |
| 2019/0261948 A1* | 8/2019 | Gong .................. G01S 7/52047 |

FOREIGN PATENT DOCUMENTS

| | | |
|---|---|---|
| CN | 105474592 A | 4/2016 |
| CN | 108370298 A | 8/2018 |
| EP | 2995027 A1 | 3/2016 |
| IN | 108370259 A | 8/2018 |
| WO | 2012006513 A1 | 1/2012 |
| WO | 2014180001 A1 | 11/2014 |

OTHER PUBLICATIONS

"Remaining issues on CW mapping and data scrambling," 3GPP TSG RAN WG1 Meeting #92bis, R1-1804967, Sanya, China, pp. 1-5, 3rd Generation Partnership Project, Valbonne, France (Apr. 16-20, 2018).

"Considerations on supporting inter-cell D2D operations," 3GPP TSG RAN WG1 Meeting #77, R1-142161, Seoul, Korea, pp. 1-3, 3rd Generation Partnership Project, Valbonne, France (May 19-23, 2014).

* cited by examiner

$$G = \begin{bmatrix} 0 & 1 & 1 & 0 & 1 & 0 & 0 & 1 \\ 0 & 0 & 1 & 1 & 1 & 1 & 0 & 0 \\ 0 & 1 & 0 & 1 & 1 & 0 & 1 & 0 \\ 0 & 0 & 0 & 0 & 1 & 1 & 1 & 1 \\ 0 & 1 & 1 & 0 & 0 & 1 & 1 & 0 \\ 0 & 0 & 1 & 1 & 0 & 0 & 1 & 1 \\ 0 & 1 & 0 & 1 & 0 & 1 & 0 & 1 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \end{bmatrix}$$

FIG. 5

| | | | | | | | | | | | | | | | |
|---|---|---|---|---|---|---|---|---|---|---|---|---|---|---|---|
| 0 | 1 | 1 | 0 | 1 | 0 | 0 | 1 | 0 | 0 | 0 | 0 | 0 | 0 | 0 | 1 |
| 0 | 0 | 1 | 1 | 1 | 1 | 0 | 0 | 0 | 0 | 0 | 0 | 0 | 0 | 1 | 0 |
| 0 | 1 | 0 | 1 | 1 | 0 | 1 | 0 | 0 | 0 | 0 | 0 | 0 | 1 | 0 | 0 |
| 0 | 0 | 0 | 0 | 1 | 1 | 1 | 1 | 0 | 0 | 0 | 0 | 1 | 0 | 0 | 0 |
| 0 | 1 | 1 | 0 | 0 | 1 | 1 | 0 | 0 | 0 | 0 | 1 | 0 | 0 | 0 | 0 |
| 0 | 0 | 1 | 1 | 0 | 0 | 1 | 1 | 0 | 0 | 1 | 0 | 0 | 0 | 0 | 0 |
| 0 | 1 | 0 | 1 | 0 | 1 | 0 | 1 | 0 | 1 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |

FIG. 9

DEVICE AND METHOD FOR SUPPORTING HYBRID AUTOMATIC REPEAT REQUEST (HARQ)

CROSS-REFERENCE TO RELATED APPLICATIONS

This application is a continuation of International Application No. PCT/EP2018/078895, filed on Oct. 22, 2018, the disclosure of which is hereby incorporated by reference in its entirety.

FIELD

The present application relates to Hybrid Automatic Repeat Request (HARQ) in wireless communication technologies, particularly, HARQ for IEEE 802.11, i.e., HARQ for Wi-Fi. The present application proposes a transmitting device and a receiving device, respectively, both the transmitting device and the receiving device are configured to support such HARQ in Wi-Fi. Further, the present application proposes corresponding HARQ methods that are compatible with IEEE 802.11.

BACKGROUND

HARQ is a widely used method in wireless and cellular technologies, wherein past transmission and current retransmissions are combined, in order to improve the decoding performance. All currently existing 802.11 standards—i.e., a/b/g/n/ac/ax—do not support HARQ. In particular, in communication systems according to these standards the coded data bits undergo scrambling at the transmitter side, and the used scrambling seed is encoded with the data payload. This means that at the receiver side, the scrambling seed used for scrambling (and hence, needed for descrambling) can be known after decoding, and thus, decoded bits can be descrambled. This means that Log Likelihood Ratios (LLR) at the input to the receiver cannot be descrambled and cannot be combined in a HARQ fashion.

Furthermore, 802.11 communication systems typically use an Aggregated Medium Access Control (MAC) Protocol Data Unit (A-MPDU), in which multiple MPDUs (i.e., data units) are aggregated to form a long transmission (hence, in effect reduced overhead), i.e., a single Physical Protocol Data Unit (PPDU). Since the physical layer (PHY) operates on the entire PPDU, regardless of the MPDUs, the scrambling seed is encoded with the first MPDU. If the first MPDU is decoded correctly, and at the same time at least one MPDU fails decoding, the transmitter will retransmit the failed MPDU, and will attach an indication of the used scrambling seed to the (now) first MPDU. This means that after the encoding, specifically Forward Error Correction (FEC) encoding, at the transmitter side, the coded bits will be different from the previous transmission, making combining at the receiver side effectively impossible.

Figure 7:
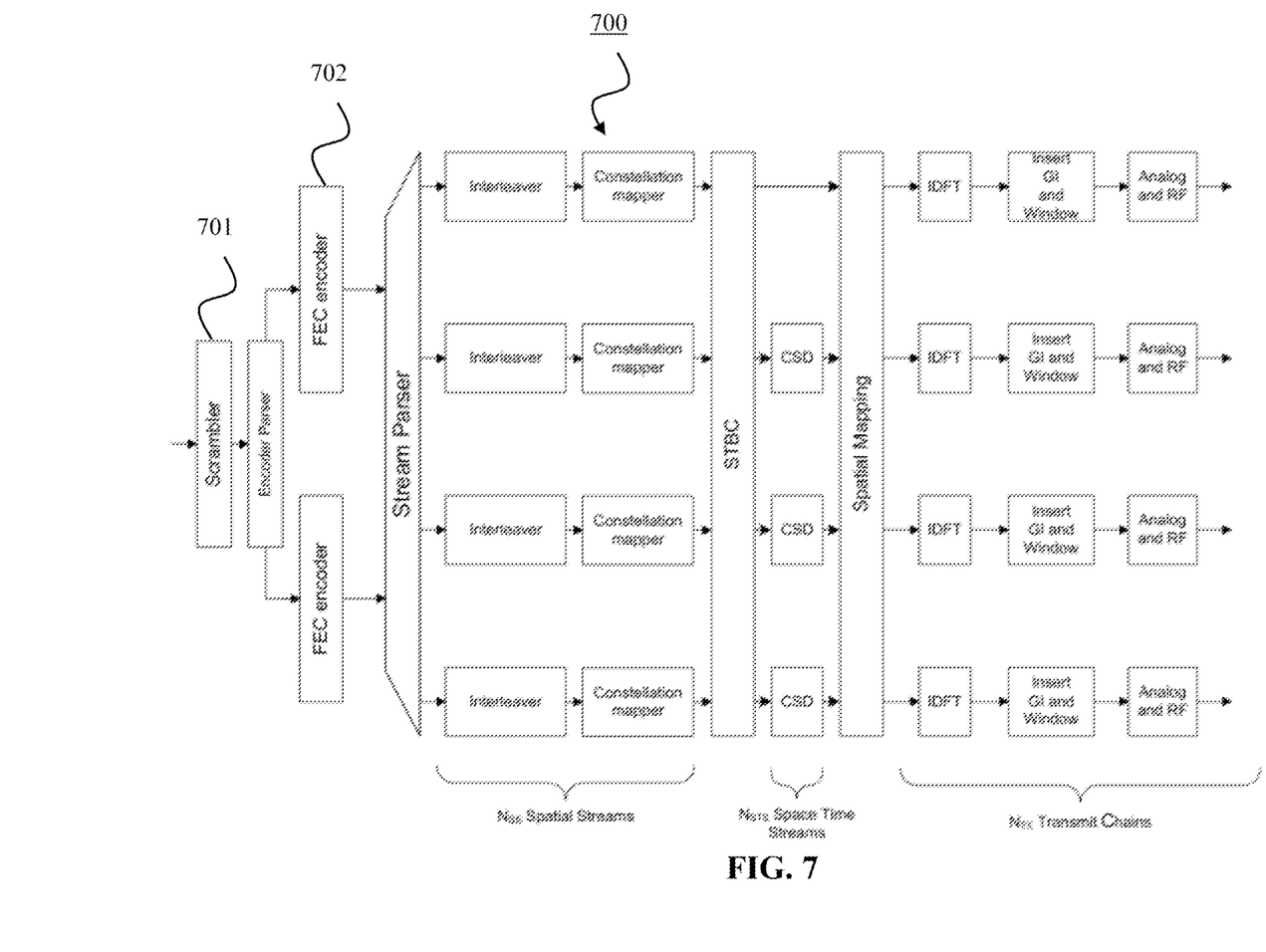
FIG. 7 shows a block diagram of a conventional 802.11n transmitter.
Figure 8:
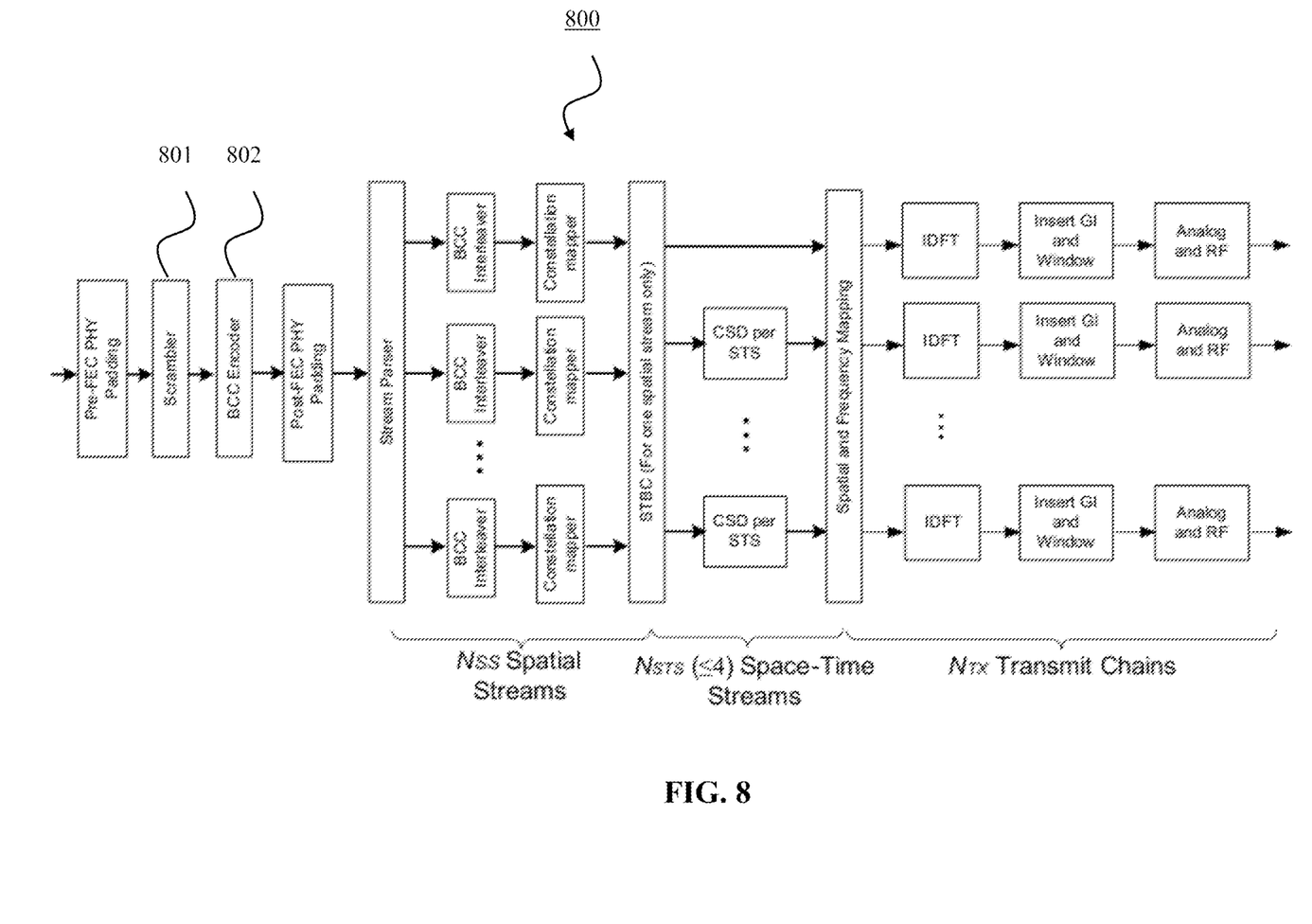
FIG. 8 shows a block diagram of a conventional 802.11ax transmitter.

In all current versions of the 802.11 standard (a/g/n/ac/ax), the scrambler operates on information bits (provided by the MAC layer to the PHY) at the transmitter side before invoking the FEC operation (encoding)—be it either Binary Convolutional Coders (BCC) or Low Density Parity Check Code (LDPC). For example, FIG. 7 shows a block diagram for an 802.11n transmitter 700, whereas FIG. 8 shows a block diagram for an 802.11ax transmitter 800. In both transmitters 700 and 800, a scrambler 701 and 801 are provided before an FEC/BCC encoder 702 and 802, resepctively.

The scrambler 701, 801 is used to avoid long sequences of same repeated bits (either many 0s or 1s) in the bit-stream, hence, its output is at least pseudo-random. This helps taming the Peak to Average Power Ratio (PAPR), and also ensures that interfering transmissions from other Stations (STAs), i.e., transmitters 700, 800, —in the extreme case they are synchronized behave more like random noise.

Figure 9:
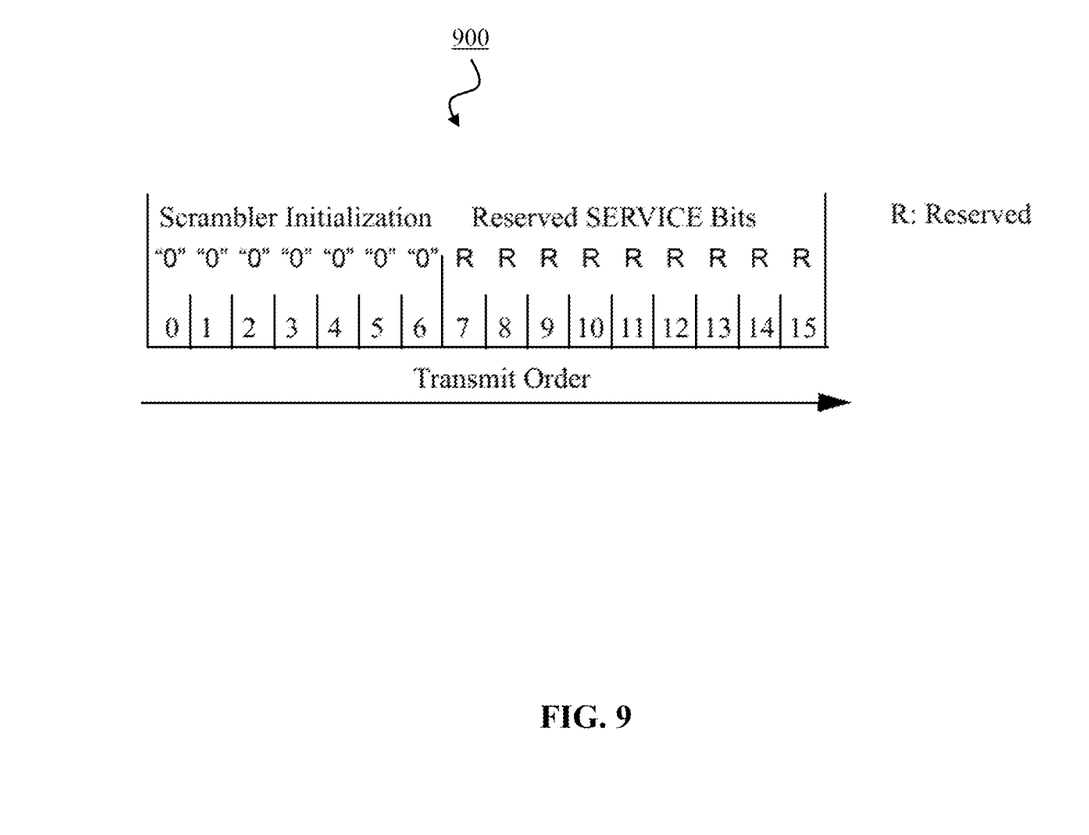
FIG. 9 shows a SERVICE filed.

The scrambling seed of the scrambler 701, 801 is thus randomly chosen, and typically changes between transmissions, so as to restrain the PAPR on average. Every data portion of the PPDU (including one or more data units) is typically prepended with a 16-bit SERVICE field, which contains 7 bits of scrambler initialization and 9 zero bits. The SERVICE filed 900 is shown in FIG. 9. The SERVICE field 900 serves as an indication of the scrambling seed.

The SERVICE field 900 is then encoded together with the data portion. This means that when, e.g., LDPC is used, (only) the first LDPC codeword contains the SERVICE field. At the receiver side, directly after the process of data decoding starts, the first 7 bits at the output of the decoder (respective to scrambler initialization) are used to configure the descrambler.

The configuration of the scrambler 701, 801 (including SERVICE field 900) and FEC, e.g., in IEEE 802.11, as described above, has the following disadvantages:

- The scrambling seed information (within the SERVICE field 900) is included with the first MPDU, hence, any retransmission of an MPDU, which is not the first within a new transmission includes the SERVICE field 900, thus changing the coded bits.
- Since the descrambler is deployed after the FEC decoder (at the receiver side), in order to make it compatible with HARQ, the scrambling seed would have to be the same for every (re)transmissions, in order to ensure that (possibly different redundancy versions of) the same codeword are carried by both the original transmission and the following (optional) retransmissions.
- The SERVICE field 900 undergoes the same coding and modulation as the data payload, implying that an error in decoding the scrambling seed leads to a failure of decoding the entire PPDU, even if there are no errors anywhere within the PPDU's actual payload.

SUMMARY

In view of the above-mentioned problems and disadvantages, embodiments of the present application aim to improve the current implementations. An objective is to make wireless communication technologies, particularly IEEE 802.11, i.e., Wi-Fi, compatible with HARQ. Thereby, all (re)transmissions use a (semi-)random scrambling seed (just like non-HARQ retransmissions). Further, a robust scheme is provided for indicating the scrambling seed to the receiving side, in order to protect the scrambling seed and thus to avoid (or at least make it much less likely) that an error in decoding the indication of the scrambling seed leads to a failure of decoding an entire (aggregated) data unit. The scheme of the application should further be compatible with the current implementations.

The objective of the present application is achieved by the solution provided in the enclosed independent claims. Advantageous implementations of the present application are further defined in the dependent claims.

In particular the present application proposes a transmitting device that performs scrambling after FEC encoding, and a receiving device that performs descrambling before FEC decoding. Additionally, a scrambling seed indication is separated from the transmitted data units.

A first aspect of the application provides a transmitting device for HARQ, the transmitting device being configured to: encode at least one data unit using FEC coding, scramble the encoded data unit based on a scrambling seed, provide an indication of the scrambling seed that is separate from the scrambled and encoded data unit, and transmit the indication of the scrambling seed and then the scrambled and encoded data unit to a receiving device.

Accordingly, unlike in the current transmitter implementations, the FEC is performed before scrambling, i.e., a FEC encoder may be arranged before a scrambler in the transmitting device. In this way, combinations of multiple transmissions become possible with a (e.g., random) scrambling seed that is changed each transmission. Further, by separating the indication of the scrambling seed from the data unit(s), the indication can be provided in a more robust manner to the receiving device, thus reducing decoding errors. Separate means that the indication of the scrambling seed is either transmitted apart, from the data unit(s), or is encoded and/or modulated differently than the data unit(s).

Without the switching of the scrambling and FEC encoding, it would be in practice impossible to descramble LLRs, and combine them at the receiving device for multiple retransmissions. Furthermore, without the separation of the indication of the scrambling seed from the data unit(s) (data payload), every retransmission, where the first data unit is different from a previous transmission, would result in a different sets of coded bits, which means that their LLRs could not be combined.

A data unit may be a MPDU. Multiple data units may be an A-MPDU, i.e., a PPDU.

In an implementation form of the first aspect, the transmitting device is configured to: encode and/or modulate the indication of the scrambling seed separately from the at least one data unit.

Thus, the scrambling seed can be encoded and/or modulated in a more robust manner, e.g., with a stronger encoding or modulation scheme, in order to reduce the risk of decoding errors. Thus, it is less likely that decoding the entire data unit(s) fails, and thus, there will be less retransmissions.

In a further implementation form of the first aspect, the transmitting device is configured to: include the indication of the scrambling seed in a PHY preamble.

In a further implementation form of the first aspect, the transmitting device is configured to: include the indication of the scrambling seed in a Signal A (SIG-A) field or a Signal B (SIG-B) field.

In a further implementation form of the first aspect, the transmitting device is configured to: define the indication of the scrambling seed based on predetermined bits of one or more signaling fields.

The above implementation forms are easy, but efficient options to separate the indication of the scrambling seed from the one or more data unit(s).

In a further implementation form of the first aspect, the transmitting device is configured to: encode the indication of the scrambling seed using a Binary Convolution Code (BCC).

Thus, the indication is encoded in a different manner than the data unit, particularly more robust. The FEC encoding of the data unit(s) is compatible with current implementations.

In a further implementation form of the first aspect, the transmitting device is configured to: encode the indication of the scrambling seed using a block code.

Thus, the indication is encoded in a different manner than the data unit, particularly simple and more robust. The FEC encoding of the data unit(s) is compatible with current implementations.

In a further implementation form of the first aspect, the transmitting device is configured to: encode the indication of the scrambling seed using a Hadamard code as a generator matrix.

In a further implementation form of the first aspect, the transmitting device is configured to: modulate the indication of the scrambling seed using Binary Phase Shift Keying (BPSK).

Thus, a strong modulation is used for the indication, making it less prone do errors.

A second aspect of the application provides a receiving device for supporting HARQ, the receiving device being configured to: receive from a transmitting device an indication of a scrambling seed and then at least one scrambled and encoded data unit that is separate from the indication of the scrambling seed, descramble the scrambled and encoded data unit based on the scrambling seed determined from the indication of the scrambling seed, and decode the encoded data unit using FEC decoding.

Accordingly, unlike in the current receiver implementations, the FEC decoding is performed after descrambling, i.e., a FEC decoder may be arranged after a descrambler. In this way, combination of multiple transmissions becomes possible with a changing (e.g., random) scrambling seed. Further, by receiving the indication of the scrambling seed separately from the data unit, the indication can be decoded in a more robust manner, thus reducing decoding errors.

In an implementation form of the second aspect, the receiving device is configured to: send to the transmitting device an Acknowledge (ACK) and/or a Not Acknowledge (NACK) message, regarding at least one data unit that was correctly and/or incorrectly decoded, receive from the transmitting device, if decoding of at least one data unit failed, a further indication of a scrambling seed and then a scrambled and encoded retransmission of the failed data unit that is separate from the further indication of the scrambling seed, descramble the scrambled and encoded retransmission of the failed data unit based on a scrambling seed determined from the further indication of the scrambling seed, decode the encoded retransmission of the failed data unit using FEC decoding, and soft combine the retransmission of the failed data unit with the previously received failed data unit.

Thus, the receiving device is configured to support and perform HARQ, particularly for Wi-Fi.

In a further implementation form of the second aspect, the receiving device is configured to: decode and/or demodulate a received indication of a scrambling seed separately from a received scrambled and encoded data unit.

In a further implementation form of the second aspect, the receiving device is configured to: derive an indication of a scrambling seed from predetermined bits of one or more signaling fields received from the transmitting device.

In a further implementation form of the second aspect, the receiving device is configured to: extract an indication of a scrambling seed from a PHY preamble, particularly from a SIG-A field or a SIG-B field, received from the transmitting device.

With the above implementation forms, the advantages described for the corresponding implementation forms of the transmitting device are achieved.

A third aspect of the application provides a method for supporting HARQ, the method comprising: encoding at least one data unit using FEC coding, scrambling the encoded data unit based on a scrambling seed, providing an indication of the scrambling seed that is separate from the scrambled and encoded data unit, and transmitting the indication of the scrambling seed and then the scrambled and encoded data unit.

In an implementation form of the third aspect, the method comprises: encoding and/or modulating the indication of the scrambling seed separately from the at least one data unit.

In a further implementation form of the third aspect, the method comprises: including the indication of the scrambling seed in a PHY preamble.

In a further implementation form of the third aspect, the method comprises: including the indication of the scrambling seed in a SIG-A field or a SIG-B field.

In a further implementation form of the third aspect, the method comprises: defining the indication of the scrambling seed based on predetermined bits of one or more signaling fields.

In a further implementation form of the third aspect, the method comprises: encoding the indication of the scrambling seed using a BCC.

In a further implementation form of the third aspect, the method comprises: encoding the indication of the scrambling seed using a block code.

In a further implementation form of the third aspect, the method comprises: encoding the indication of the scrambling seed using a Hadamard code as a generator matrix.

In a further implementation form of the third aspect, the method comprises: modulating the indication of the scrambling seed using BPSK.

With the method of the third aspect, the advantages and effects described above with respect to the transmitting device of the first aspect are achieved.

A fourth aspect of the application provides a method for supporting HARQ, the method comprising: receiving an indication of a scrambling seed and then at least one scrambled and encoded data unit that is separate from the indication of the scrambling seed, descrambling the scrambled and encoded data unit based on the scrambling seed determined from the indication of the scrambling seed, and decoding the encoded data unit using FEC decoding.

In an implementation form of the fourth aspect, the method comprises: sending to the transmitting device an Acknowledge (ACK) or a Not Acknowledge (NACK) message, regarding at least one data unit that was correctly or incorrectly decoded, receiving, if decoding of at least one data unit failed, a further indication of a scrambling seed and then a scrambled and encoded retransmission of the failed data unit that is separate from the further indication of the scrambling seed, descrambling the scrambled and encoded retransmission of the failed data unit based on a scrambling seed determined from the further indication of the scrambling seed, decoding the encoded retransmission of the failed data unit using FEC decoding, and soft combining the retransmission of the failed data unit with the previously received failed data unit.

In a further implementation form of the fourth aspect, the method comprises: decoding and/or demodulating a received indication of a scrambling seed separately from a received scrambled and encoded data unit.

In a further implementation form of the fourth aspect, the method comprises: deriving an indication of a scrambling seed from predetermined bits of one or more received signaling fields.

In a further implementation form of the fourth aspect, the method comprises: extracting an indication of a scrambling seed from a PHY preamble, particularly from a received SIG-A field or a SIG-B field.

With the method of the fourth aspect, the advantages and effects described above with respect to the receiving device of the second aspect are achieved.

In summary, the embodiments (aspects and implementation forms) of the present application base on performing scrambling after FEC encoding, and performing descrambling before FEC decoding. As a result:

The scrambling seed can be changed upon every (HARQ) retransmission—and LLRs after descrambling can be combined—for better detection.

The scrambling seed is separated from the data unit(s) to make it more robust.

The data unit(s) do not need to be aligned with a scrambling sequence periodicity (in HARQ mode), and can still be aligned with a FEC block length.

If the scrambling seed would not be separated, then in case of retransmission of non-first data units (becoming first), the scrambling seed would have to be included with a first retransmitted data unit, hence, changing coded bits.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present application will be explained in the following description of exemplary embodiments in relation to the enclosed drawings, in which.

DETAILED DESCRIPTION

Figure 1:
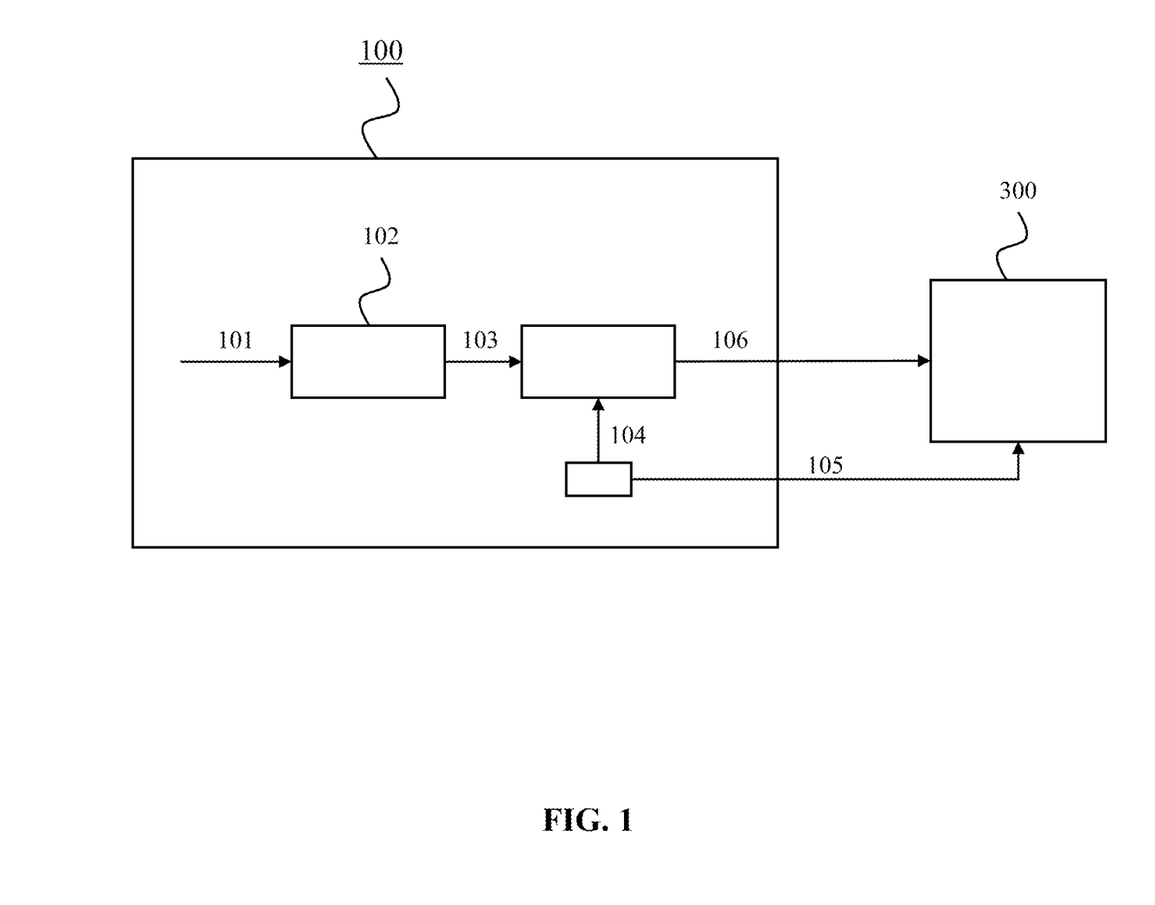
FIG. 1 shows a transmitting device according to an exemplary embodiment of the present application.

FIG. 1 shows a transmitting device 100 according to an exemplary embodiment of the present application. The transmitting device 100 is configured to support HARQ, particularly HARQ for IEEE 802.11/Wi-Fi. That means, the device 100 may be an 802.11-standard transmitting device supporting HARQ.

The transmitting device 100 is configured to encode at least one data unit 101 using FEC coding 102, in order to obtain at least one encoded data unit 103. The FEC coding 102 may be carried out by a conventional FEC encoder, as, e.g., in the conventional transmitter shown in FIG. 7. The data unit 101 may be a MPDU, and if more than one data unit 101 is encoded, the data units 101 may be in an A-MPDU, i.e., may form a PPDU.

Further, the transmitting device 100 is configured to scramble the encoded data unit 103 based on a scrambling seed 104, in order to obtain at least one scrambled and encoded data unit 106. The scrambling may be carried out by a scrambler, which is accordingly located in the device 100 after a FEC encoder that carries out the FEC encoding 102. The scrambling seed 104 may include a sequence of bits used as input to the scrambler for scrambling the bits of the encoded data unit 103.

The transmitting device 100 is then configured to provide an indication 105 of the scrambling seed 104 that is separate from the scrambled and encoded data unit 106. The indication 105 may be designed such that the scrambling seed 104 can be obtained based on it, e.g., can be calculated or derived from the indication 105.

Finally, the transmitting device 100 is configured to transmit the indication 105 of the scrambling seed 104, and then, i.e., after transmitting the indication, transmit the scrambled and encoded data unit 106 to a receiving device 300, either directly or indirectly.

Figure 2:
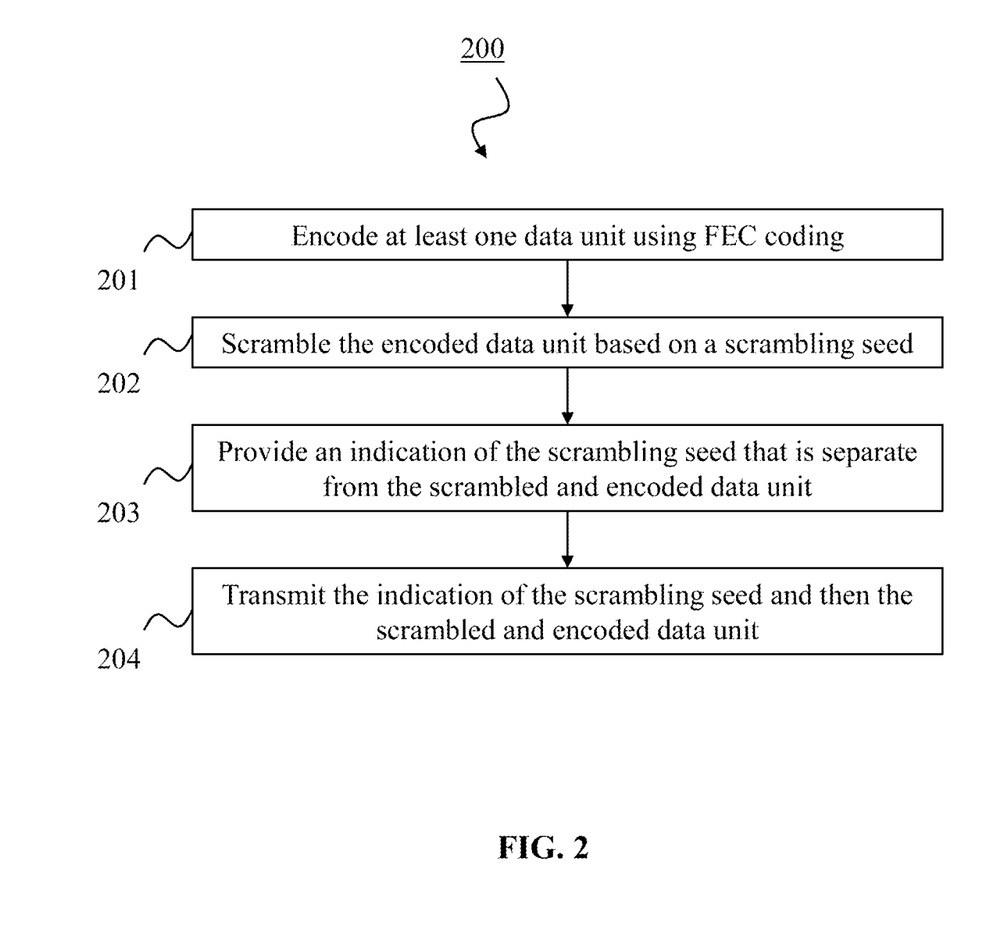
FIG. 2 shows a method according to an exemplary embodiment of the present application.

FIG. 2 shows a corresponding method 200 according to an exemplary embodiment of the present application, which method 200 can accordingly be carried out by the transmitting device 100 of FIG. 1. The method 200 is for supporting HARQ, particularly for Wi-Fi.

The method 200 comprises: a step 201 of encoding at least one data unit 101 using FEC coding 102; a step 202 of scrambling the encoded data unit 103 based on a scrambling seed 104; a step 203 of providing an indication 105 of the scrambling seed 104 that is separate from the scrambled and encoded data unit 106; and a step 204 of transmitting the indication 105 of the scrambling seed 104, and then the scrambled and encoded data unit 106.

Figure 3:
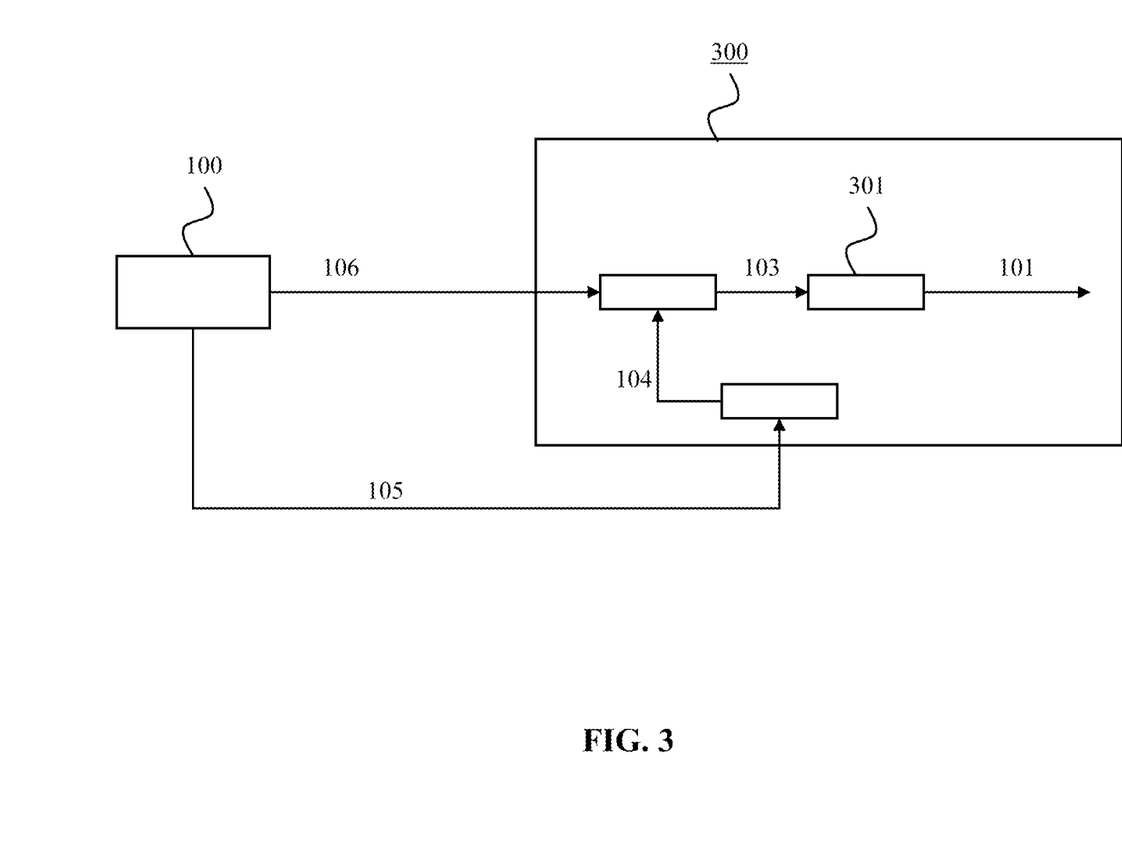
FIG. 3 shows a receiving device according to an exemplary embodiment of the present application.

FIG. 3 shows a receiving device 300 according to an exemplary embodiment of the present application. The receiving device 300 is configured to support HARQ, particularly HARQ for IEEE 802.11/Wi-Fi, i.e., the device 300 may be an 802.11-standard receiving device supporting HARQ.

The receiving device 300 is configured to receive, from a transmitting device 100, an indication 105 of a scrambling seed 104, and then, i.e., after receiving the indication 105, to receive at least one scrambled and encoded data unit 106 that is separate from the indication 105 of the scrambling seed 104. The transmitting device 100 is particularly the one shown in FIG. 1.

The receiving device 300 is further configured to descramble the scrambled and encoded data unit 106 based on the scrambling seed 104 determined from the indication 105 of the scrambling seed 104, in order to obtain at least one encoded data unit 103. The descrambling may be performed by a descrambler, as, e.g., one as provided in a conventional receiver.

Further, the receiving device 300 is then configured to decode the encoded data unit 103 using FEC decoding 301, in order to obtain at least one data unit 101. The data unit 101 may again be an MPDU, more data units 101 may be an A-MPDU or PPDU. The FEC decoding 301 may be performed by a conventional FEC decoder, which is arranged after the descrambler that carries out the descrambling.

Figure 4:
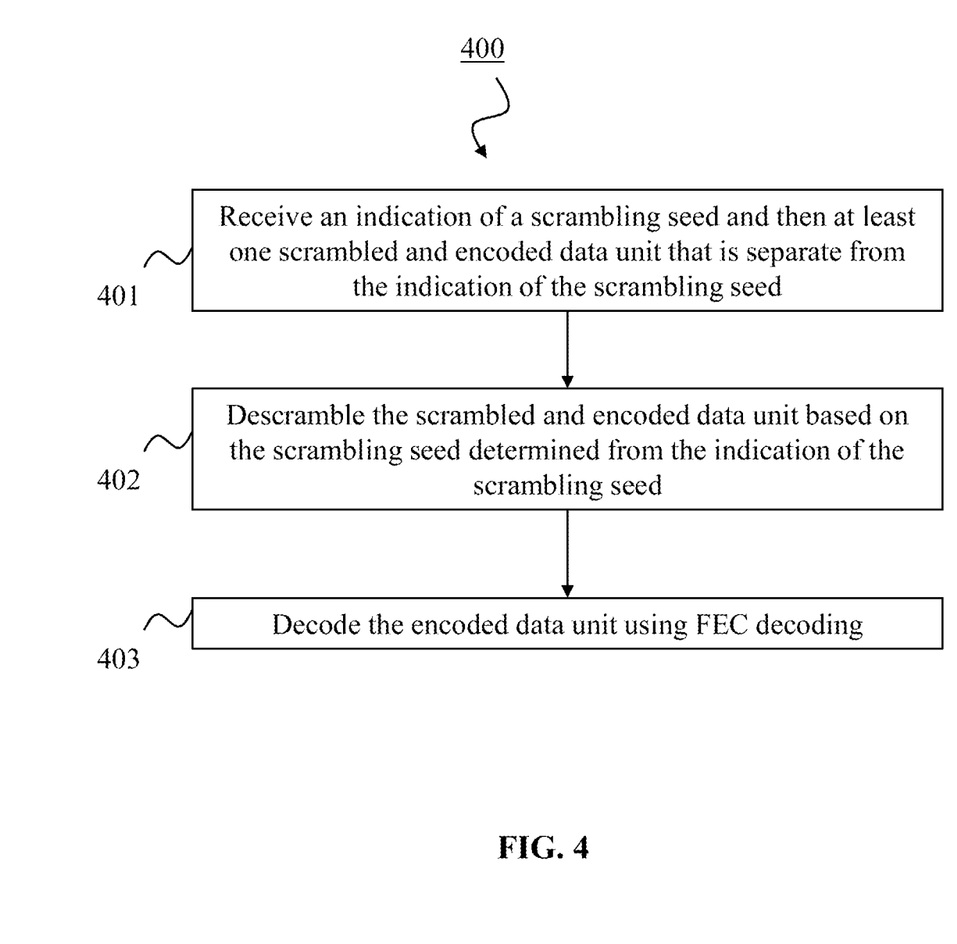
FIG. 4 shows a method according to an exemplary embodiment of the present application.

FIG. 4 shows a corresponding method 400 according to an exemplary embodiment of the present application, which method 400 can accordingly be carried out by the receiving device 300 of FIG. 3. The method 400 is for supporting HARQ, particularly for Wi-Fi.

The method 400 comprises: a step 401 of receiving an indication 105 of a scrambling seed 104 and then at least one scrambled and encoded data unit 106 that is separate from the indication 105 of the scrambling seed 104; a step 402 of descrambling 402 the scrambled and encoded data unit 106 based on the scrambling seed 104 determined from the indication 105 of the scrambling seed 104; a step 403 of decoding the encoded data unit 103 using FEC decoding 301.

In the following, more details regarding the above-described devices 100 and 300, and respectively corresponding to the methods 200 and 400, are provided. In particular, different solutions are presented for achieving the two main aspects of embodiments of the present application, namely:

Firstly, a switching of the location/order of the FEC encoding 102 (FEC encoder) and scrambling (scrambler) in the transmitting device 100—compared to the conventional transmitter—i.e., the scrambler is located after the FEC encoder to operate on the encoded bits of the data unit 101. And likewise, a switching of the location/order of the descrambling (descrambler) and FEC decoding 301 (FEC decoder) in the receiving device 300—compared to the conventional receiver—i.e., the descrambler is located before the FEC decoder, so that the descrambler operates on the encoded bits of the data unit 101.

Secondly, a separation of the indication 105 of the scrambling seed 104, e.g., the SERVICE field that is used conventionally, from the data unit(s) 101. That is, the indication 105 is either provided in a different part of a transmission than the data unit(s) 101, or is encoded and/or modulated differently than the data unit(s).

Since the scrambling seed 104 changes at every (re)transmission, while still sending the same codeword (up to redundancy versions), the scrambling in the transmitting device 100 operates on the coded bits of the data unit 101. This allows the LLRs (soft-bits) at the receiving device 300 to be descrambled prior to combining. This is true for both BCC and LDPC. Thus, the indication 105 of the scrambling seed 104 (e.g., the SERVICE field) is provided separately from the data unit 101. The transmitting device 100 indicates 105 the scrambling seed 104 to the receiving device 300 before data unit(s).

A first option for indicating the scrambling seed 104 is now described. In particular, a very simple solution is to remove the indication 105 (e.g., the entire SERVICE field) from its current location (before the data portion), and move the scrambling seed indication 105 to the PHY preamble. That is, the transmitting device 100 may be configured to include the indication 105 of the scrambling seed 104 in a PHY preamble, and accordingly the receiving device 300 may be configured to extract the indication 105 of the scrambling seed 104 from the PHY preamble. The PHY preamble is a different part of a transmission than the data portion (data unit(s)).

For example, the scrambling seed (which may be 7 bits) may be indicated 105 within SIG-A (for all STAs) or within SIG-B (for each STA). That means, the transmitting device 100 may be configured to include the indication 105 of the scrambling seed 104 in a SIG-A field or a SIG-B field, and accordingly, the receiving device 300 may be configured to extract the indication 105 of the scrambling seed 104 from the SIG-A field or SIG-B field received from the transmitting device 100. This is a simple solution, but there will be a bit overhead.

Alternatively, an existing field may be used (e.g., some combination of the bits representing the STA's STA-ID & SIG-B Cyclic Redundancy Check (CRC) combination of STA's STA-ID and L-SIG length, 7 Least Significant Bits (LSB), of L-SIG length), in order to generate a new, e.g., pseudo-random scrambling seed 104, using, e.g., a predefined recipe (thus, known to both transmitting device 100 and receiving device 300). That is, the transmitting device 100 may be configured to define the indication 105 of the scrambling seed 104 based on predetermined bits of one or more signaling fields, and the receiving device 300 may accordingly be configured to derive the indication 105 of the scrambling seed 104 from predetermined bits of one or more signaling fields received from the transmitting device 100.

A second option for indicating the scrambling seed 104 is now described. In particular, the indication 105 (e.g., SERVICE field) may be maintained as it is and at the location it is conventionally, but may be encoded and/or modulated separately from the data unit(s) 101 in the transmitting device 100, so that the receiving device 300 can decode and/or demodulate it separately from the data unit(s), can obtain the descrambling seed 104, and can use it immediately on the LLRs.

BCC encoding can, for instance, be used. If BCC (and hence, Viterbi decoding) is used, appending the indication 105 (e.g., SERVICE field, or seed information) may ensure the Viterbi decoder has enough depth.

A third option for indicating the scrambling seed 104 is now described. In particular, the indication 105 (e.g., SERVICE field) may be maintained as it is and at the location it is conventionally, but may be encoded and/or modulated separately from the data unit(s) 101. For instance, in order to ensure maximum robustness, BPSK modulation with some block-code encoding, for example, of rate 1/2 may be used, regardless of the Modulation and Coding Scheme (MCS) used for the data unit(s) 101. Hence, the indication 105 (SERVICE field) is encoded and modulated using a very robust scheme.

Figure 5:
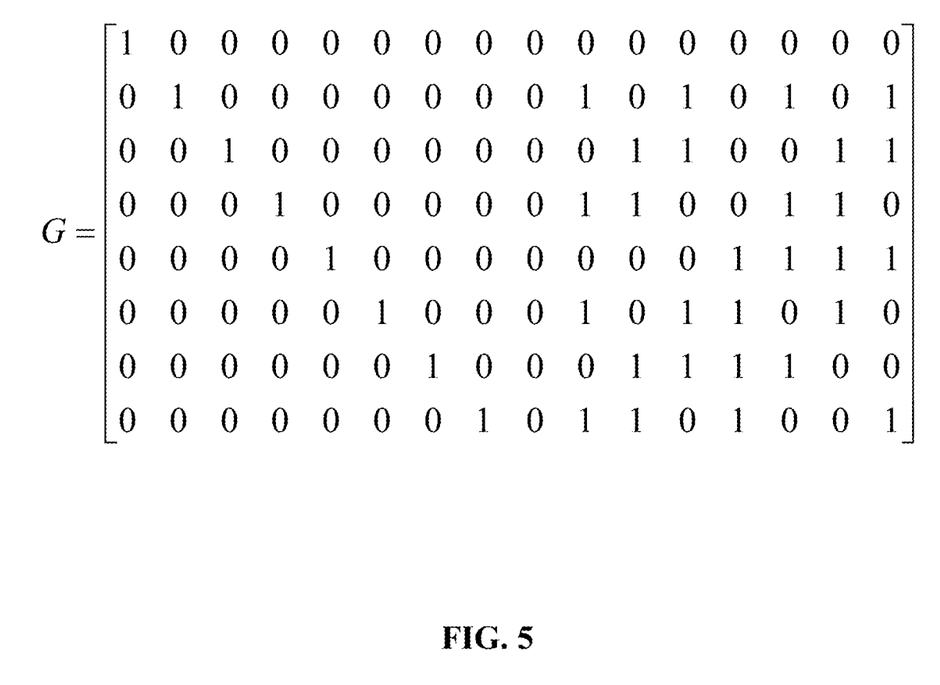
FIG. 5 shows a generator matrix.
Figure 6:
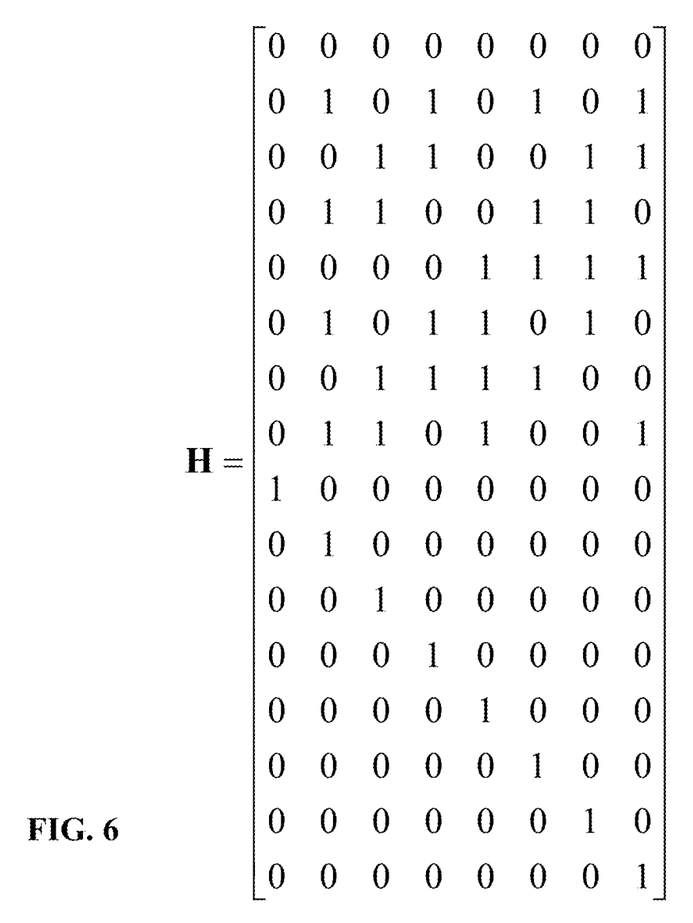
FIG. 6 shows a parity check matrix.

This means that the number of tones allocated for the indication 105 (e.g., SERVICE field) is fixed, hence, it is easy to compute the number of tones for the data unit(s) 101, LDPC parameters (shortening/puncturing/repetition), preFEC bits, etc. A simple block code can be used. For example, one can use a systematic linear block code with coding rate 1/2, where the scrambling seed 104 is appended with 1 bit (to make it 8 bits), and a Hadamard code may be used for the generator matrix 500, which is shown in FIG. 5. A parity check matrix is shown in FIG. 6.

The present application has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A transmitting device for supporting hybrid automatic repeat request (HARQ), the transmitting device being configured to:
   encode at least one data unit using forward error correction (FEC) coding;
   scramble the encoded data unit based on a scrambling seed;
   provide an indication of the scrambling seed that is separate from the scrambled and encoded data unit, wherein the scrambling seed is obtained based on the indication of the scrambling seed; and
   transmit the indication of the scrambling seed and then separately transmit the scrambled and encoded data unit apart from the indication of the scrambling seed to a receiving device; and define the indication of the scrambling seed based on predetermined bits of one or more signaling fields.

2. The transmitting device according to claim 1, further configured to:
   encode and/or modulate the indication of the scrambling seed separately from the at least one data unit.

3. The transmitting device according to claim 1, further configured to:
   include the indication of the scrambling seed in a physical layer (PHY) preamble.

4. The transmitting device according to claim 1, further configured to:
   include the indication of the scrambling seed in a signal A (SIG-A) field or a signal B (SIG-B) field.

5. The transmitting device according to claim 1, further configured to:
   encode the indication of the scrambling seed using a binary convolution code (BCC).

6. The transmitting device according to claim 1, further configured to:
   encode the indication of the scrambling seed using a block code.

7. The transmitting device according to claim 6, further configured to:
   encode the indication of the scrambling seed using a Hadamard code as a generator matrix.

8. The transmitting device according to claim 1, further configured to:
   modulate the indication of the scrambling seed using a binary phase shift keying (BPSK).

9. The transmitting device according to claim 1, wherein the scrambling seed is calculated or derived from the indication of the scrambling seed.

10. A method for supporting hybrid automatic repeat request (HARQ), the method comprising:
    encoding at least one data unit using forward error correction (FEC) coding;
    scrambling the encoded data unit based on a scrambling seed;
    providing an indication of the scrambling seed that is separate from the scrambled and encoded data unit, wherein the scrambling seed is obtained based on the indication of the scrambling seed; and
    transmitting the indication of the scrambling seed and then separately transmitting the scrambled and encoded data unit apart from the indication of the scrambling seed to a receiving device; and define the indication of the scrambling seed based on predetermined bits of one or more signaling fields.

11. The method according to claim 10, further comprising:
    encoding the indication of the scrambling seed separately from the at least one data unit.

12. The method according to claim 10, further comprising:
    including the indication of the scrambling seed in a physical layer (PHY) preamble, a signal A (SIG-A) field or a signal B (SIG-B) field.

13. The method according to claim 10, further comprising:
    encoding the indication of the scrambling seed using a binary convolution code (BCC).

14. The method according to claim 10, further comprising:
    encoding the indication of the scrambling seed using a block code.

15. The method according to claim 10, wherein the scrambling seed is calculated or derived from the indication of the scrambling seed.

\* \* \* \* \*

UNITED STATES PATENT AND TRADEMARK OFFICE
CERTIFICATE OF CORRECTION

| | | |
|---|---|---|
| PATENT NO. | : 12,160,313 B2 | Page 1 of 1 |
| APPLICATION NO. | : 17/237867 | |
| DATED | : December 3, 2024 | |
| INVENTOR(S) | : Shilo et al. | |

It is certified that error appears in the above-identified patent and that said Letters Patent is hereby corrected as shown below:

On the Title Page

Page 2: Item (56) References Cited, Foreign Patent Documents: "IN108370259 A" should read as -- CN108370259 A --.

Signed and Sealed this
Tenth Day of June, 2025

Coke Morgan Stewart
*Acting Director of the United States Patent and Trademark Office*